Oct. 14, 1969 G. W. NIEMANN 3,473,045
COMPLEMENTARY J-K FLIP-FLOP USING TRANSISTOR LOGIC
Filed April 18, 1966 2 Sheets-Sheet 1
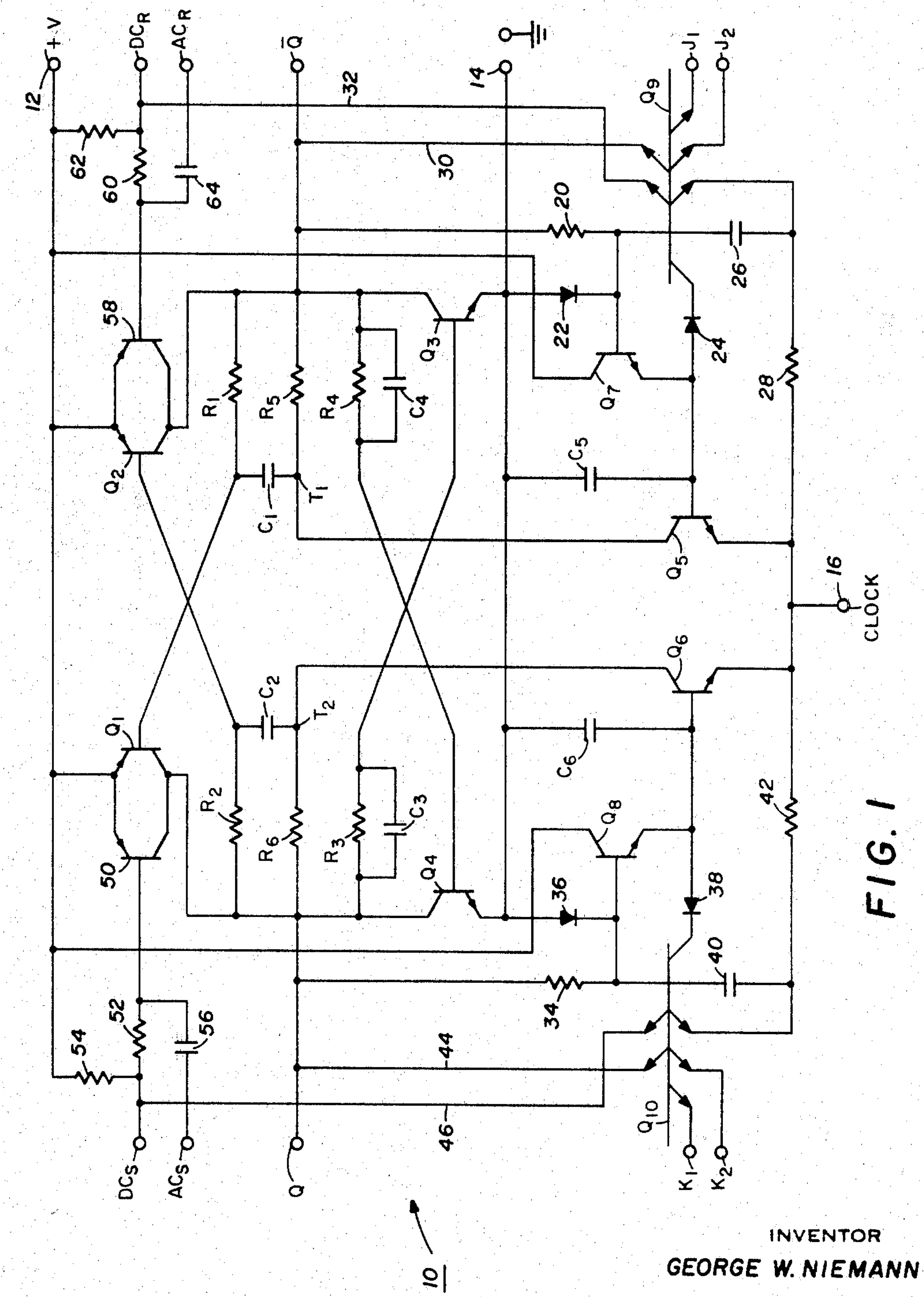
FIG. I
INVENTOR
GEORGE W. NIEMANN
E. Mickey Hubbard
ATTORNEY

| $t_n$ | | | | $t_{n+1}$ |
|---|---|---|---|---|
| $J_1$ | $J_2$ | $K_1$ | $K_2$ | Q |
| 0 | 0 | 0 | 0 | $Q_n$ |
| 0 | 0 | 0 | 1 | $Q_n$ |
| 0 | 0 | 1 | 0 | $Q_n$ |
| 0 | 0 | 1 | 1 | 0 |
| 0 | 1 | 0 | 0 | $Q_n$ |
| 0 | 1 | 0 | 1 | $Q_n$ |
| 0 | 1 | 1 | 0 | $Q_n$ |
| 0 | 1 | 1 | 1 | 0 |
| 1 | 0 | 0 | 0 | $Q_n$ |
| 1 | 0 | 0 | 1 | $Q_n$ |
| 1 | 0 | 1 | 0 | $Q_n$ |
| 1 | 0 | 1 | 1 | 0 |
| 1 | 1 | 0 | 0 | 1 |
| 1 | 1 | 0 | 1 | 1 |
| 1 | 1 | 1 | 0 | 1 |
| 1 | 1 | 1 | 1 | $\bar{Q}_n$ |

FIG. 5

| LOGIC | | |
|---|---|---|
| $K_1$ | $K_2$ | $K_1 K_2$ |
| 0 | 0 | 0 |
| 0 | 1 | 0 |
| 1 | 0 | 0 |
| 1 | 1 | 1 |

FIG. 2

| LOGIC | | |
|---|---|---|
| $J_1$ | $J_2$ | $J_1 J_2$ |
| 0 | 0 | 0 |
| 0 | 1 | 0 |
| 1 | 0 | 0 |
| 1 | 1 | 1 |

FIG. 3

| $t_n$ | | $t_{n+1}$ |
|---|---|---|
| J | K | Q |
| 0 | 0 | $Q_n$ |
| 0 | 1 | 0 |
| 1 | 0 | 1 |
| 1 | 1 | $\bar{Q}_n$ |

FIG. 4

INVENTOR
GEORGE W. NIEMANN
E. Mickey Hubbard
ATTORNEY 3,473,045
COMPLEMENTARY J-K FLIP-FLOP USING TRANSISTOR LOGIC George W. Niemann, Dallas, Tex., assignor to Texas Instruments Incorporated, Dallas, Tex., a corporation of Delaware Filed Apr. 18, 1966, Ser. No. 543,406
Int. Cl. H03k *19/22, 19/8, 19/12*
U.S. Cl. 307—203 14 Claims The invention described herein was made in the performance of work under a NASA contract and is subject to the provisions of Section 305 of the National Aeronautics and Space Act of 1958, Public Law 85–568 (72 Stat. 435; 42 USC 2457).

This invention relates generally to logic systems, and more particularly relates to an improved binary storage circuit having a low average power dissipation with additional logic flexibility, yet capable of operating at high speeds.

Speed is one of the principal features of merit in a logic circuit. In this case, the term "speed" includes the rate at which the output of the logic circuit changes from one state to another, the rate at which the circuit can be cycled between states, and the delay in propagating the logic levels through the circuit. In general, the speed of operation of a logic circuit can be increased by increasing the power applied to the circuit. In many applications, such as in airborne and space systems, power must be supplied by batteries or solar cells and is therefore at a premium. Even in systems where power is readily available, it is generally desirable to reduce the power required in order to reduce the amount of heat dissipated and thus permit greater component density and thus greater overall system speed. Accordingly, considerable effort has been devoted toward the development of micropower logic circuits.

A J–K flip-flop may be defined as a binary storage circuit having no indeterminate states. The basic bistable section may be comprised of two pairs of complementary transistors interconnected to form a bridge and operated so as to selectively connect a voltage supply to a true output and a ground to a complement output, or in the alternative, to connect the complement output to the voltage supply and the true output to ground. A regenerative feedback system is often used to achieve switching and to maintain the binary circuit in the two stable states.

Various logic circuits have been used to control the operation of the binary storage section and these logic circuits may be classified generally in accordance with the components used to effect the gating at the input and the logic levels at the output of the gating to trigger the binary storage circuit. The more conventional circuits use either diodes or resistors in combination with a single ended transistor to provide the necessary output logic and drive capability. In general, the approach has been to increase the values of the resistors of the circuit to limit power. But as a result, the rise times are degraded, thus slowing operation of the flip-flop. Also, power is dissipated in the collector load resistor. Previous circuits using transistor input logic as well as transistors to drive the bistable section have required the equivalent of two to eight gates in order to achieve a J–K flip-flop, and this increases power requirements substantially. Complementary resistor-diode-transistor logic circuitry heretofore employed has required the use of large resistors which result in high impedance transient paths and consequently slow switching times. Bistable logic circuits which have been triggered by a single point diode input have resulted in excessive power dissipation, and the maximum frequency of these circuits is to a large extent a function of the clock duty cycle. The use of a single input transistor for triggering the binary has heretofore resulted in holding both the input points down, thus limiting the minimum recovery time to an input RC time constant, and also resulted in the blocking of the regeneration path for this same RC time period.

Therefore, an important object of this invention is to provide a bistable logic device having decreased power requirements without sacrificing speed of operation and also having increased logic flexibility.

Another object is to provide a circuit wherein power is drawn for gating purposes only when gating is required.

Another object is to provide a bistable logic circuit having two independently controlled trigger points which permit operation as a J–K flip-flop while simultaneously permitting rapid recovery of the trigger input and therefore achieving greater repetition rates.

Another object is to provide a bistable logic circuit in which the input gates recover rapidly.

A further object is to provide such a circuit having rapid and positive control of the self-gating or steering function.

Another object is to provide such a circuit having a D.C. set and reset function which automatically inhibits the clock input during the D.C. set and reset period without the use of additional active components.

Another important object of the invention is to provide such a circuit which may be fabricated in monolithic or solid state form.

These and other objects and advantages are accomplished by a conventional binary circuit formed by four transistors connected in a bridge so as to connect a true output to a logic "1" voltage level and a complement output to a logic "0" level, and alternatively, connect the true output to the logic "0" level and the complement output to the logic "1" level. The base of each transistor is driven by a regenerative feedback circuit so as to establish two stable states and a means for switching from one state to another.

In accordance with the present invention, the binary circuit is provided with first and second independent trigger nodes and the binary may be switched from the logic "0" state to the logic "1" state by a pulse applied to the first trigger node and from the logic "1" state to the logic "0" state by a pulse applied to the second trigger node. In accordance with a specific aspect of the invention, the pulse is applied to the trigger nodes by first and second trigger transistors the collectors of which are connected to the first and second trigger nodes, respectively, and the emitters of which are common and are connected to a clock input terminal. The bases of the first and second trigger transsistors are driven by current from first and second trigger capacitors which are connected to discharge into the bases of the respective transistors whenever a clock pulse is applied to the emitters of the trigger transistors.

Each of the trigger capacitors may be selectively disabled by input logic means which, in accordance with another specific aspect, is comprised of a multiple emitter transistor the collector of which is connected to the capacitor and the emitters of which form the logic inputs. If any one of the emitters is forward biased, the logic input transistor will conduct and prevent charging of the respective trigger capacitor.

A means is provided for rapidly charging each of the trigger capacitors after it has been discharged. This preferably comprises a charging transistor the emitter of which is connected to the capacitor and the collector of which is connected to a voltage supply. The base of each charging capacitor is preferably A.C. coupled through a delay resistor to the clock input terminal so that the second transition of the clock pulse will turn the charging transistor on and recharge the trigger capacitor.

The base of each logic input transistor and the corresponding transistor are preferably common and are D.C. coupled through a relatively large resistance to a logic output so that the logic input transistor and the charging transistor will be operated only when a logic function is required.

In accordance with another aspect of the invention, one of the emitters of each logic transistor is connected to the appropriate output so as to operate the binary as a J-K flip-flop.

In accordance with another aspect of the invention, both D.C. and A.C. set and reset functions are provided during which the clock input is disabled to prevent false switching of the binary during the reset period.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIGURE 1 is a schematic circuit diagram of a J-K flip-flop constructed in accordance with the present invention;

FIGURE 2 is a truth table for the one input gate of the logic circuit illustrated in FIGURE 1;

FIGURE 3 is a truth table for the other input gate of the logic circuit illustrated in FIGURE 1;

FIGURE 4 is a truth table for the logic circuit illustrated in FIGURE 1 when only two logic inputs are used; and FIGURE 5 is a truth table for the logic circuit of FIGURE 1 when four logic inputs are used.

Referring now to the drawings, a bistable logic circuit constructed in accordance with the present invention is indicated generally by the reference numeral 10. The circuit 10 has a positive voltage supply terminal 12 and a relatively negative voltage supply terminal 14 which will customarily be connected to ground. A first complementary pair of transistors $Q_1$ and $Q_4$ are connected between the positive terminal 12 and the ground terminal 14. The collectors of transistors $Q_1$ and $Q_4$ are common and form the true output terminal Q. A second complementary pair of transistors $Q_2$ and $Q_3$ are also connected between the positive voltage supply terminal 12 and the ground terminal 14. The collectors of transistors $Q_2$ and $Q_3$ are common and form the complement output $\overline{Q}$. The base of transistor $Q_1$ is D.C. coupled to the complement output $\overline{Q}$ by resistor $R_1$, the base of transistor $Q_2$ is D.C. coupled to the true output Q by resistor $R_2$, the base of transistor $Q_3$ is D.C. coupled by resistor $R_3$ to the true output Q, and the base of transistor $Q_4$ is D.C. coupled by resistor $R_4$ to the complement output $\overline{Q}$. The base of transistor $Q_3$ is also A.C. coupled to the true output Q by capacitor $C_3$ and the base of transistor $Q_4$ is A.C. coupled to the complement output $\overline{Q}$ by capacitor $C_4$.

It is to be understood that the outputs Q and $\overline{Q}$ have been arbitrarily designated as the true and the complement outputs in order to simplify a description of the circuit and its operation. When the flip-flop is in the logic "0" state, transistors $Q_2$ and $Q_4$ are turned on, and transistors $Q_1$ and $Q_3$ are turned off. Thus, the complement output $\overline{Q}$ is connected by transistor $Q_2$ to terminal 12 and the complement output is essentially at the voltage of terminal 12. The true output Q is connected by transistor $Q_4$ to the ground terminal 14 and the output is essentially at ground potential. For the logic "1" state, transistors $Q_1$ and $Q_3$ are turned on, and transistor $Q_2$ and $Q_4$ are turned off. Then the true output Q is connected by transistor $Q_1$ to the positive terminal 12, and the complement output $\overline{Q}$ is connected by transistor $Q_3$ to the ground terminal 14.

The trigger circuit for the flip-flop 10 includes transistors $Q_5$ and $Q_6$. The emitter of transistor $Q_5$ is connected to a clock input terminal 16 and the collector is A.C. coupled by capacitor $C_1$ to the base of transistor $Q_1$ and is D.C. coupled to the complement output $\overline{Q}$ by resistor $R_5$. The emitter of transistor $Q_6$ is also connected to the clock input 16 and the collector is A.C. coupled by capacitor $C_2$ to the base of transistor $Q_2$ and is D.C. coupled by resistor $R_6$ to the collector of transistors $Q_1$ and $Q_4$ and hence to the true output Q. The binary stage has two separate trigger points $T_1$ and $T_2$ and when a negative pulse is applied to either trigger point, the pulse will be coupled to the base of the corresponding transistor $Q_1$ or $Q_2$ and the state of the binary stage will be changed as hereinafter described. The negative pulses are selectively applied to the trigger points $T_1$ and $T_2$ by momentarily lowering the potential at the clock terminal 16 from the voltage at terminal 12 to ground potential. Then if the base of either transistor $Q_5$ or $Q_6$ is positive, the transistor will conduct and apply a negative pulse to the respective trigger point.

The base of transistor $Q_5$ is driven by current discharged from a capacitor $C_5$ connected between the base of transistor $Q_5$ and ground, and the base of transistor $Q_6$ is driven by current discharged from capacitor $C_6$ which is connected between the base of transistor $Q_6$ and ground. The capacitor $C_5$ is charged through a transistor $Q_7$. The collector of transistor $Q_7$ is connected to the positive voltage supply terminal 12, and the emitter is connected to charge the capacitor $C_5$. The base of transistor $Q_7$ is connected to the complement output $\overline{Q}$ by resistor 20 and to the clock input 16 by capacitor 26 and resistor 28. A diode 22 interconnects the base of transistor $Q_7$ and ground for protective purposes. The capacitor $C_5$ is discharged, or prevented from being charged, by a multiple emitter logic transistor $Q_9$ the collector of which is connected through diode 24 to the capacitor $C_5$ and thus to the base of transistor $Q_5$. The base of logic transistor $Q_9$ is common with the base of transistor $Q_7$ and therefore is A.C. coupled to the clock input 16 through the capacitor 26 and resistor 28, and is D.C. coupled to the complement output $\overline{Q}$ by resistor 20. One emitter of transistor $Q_9$ is D.C. coupled to the clock input 16 by resistor 28, and another emitter is D.C. coupled by conductor 30 to the complement output $\overline{Q}$. Two of the emitters of transistor $Q_9$ form logic inputs $J_1$ and $J_2$. Still another emitter is connected by conductor 32 to a D.C. reset input terminal $DC_R$. Capacitor $C_6$ may similarly be charged through transistor $Q_8$. The emitter of transistor $Q_8$ is connected to capacitor $C_6$ and the collector is connected to the positive supply voltage terminal 12. The base of transistor $Q_8$ is A.C. coupled to the clock input 16 by capacitor 40 and resistor 42 and is D.C. coupled to the true output Q by resistor 34. A diode 36 interconnects the ground terminal 14 and the base of transistor $Q_8$ for protective purposes. The capacitor $C_6$ can be discharged, or prevented from being charged, by the circuit including a diode 38 and a collector-emitter circuit of a multiple emitter logic transistor $Q_{10}$. The base of logic transistor $Q_{10}$ is common with the base of transistor $Q_8$ and is therefore D.C. coupled to the true output Q by resistor 34, and is also A.C. coupled to the clock input terminal 16 through capacitor 40 and resistor 42. One emitter of transistor $Q_{10}$ is also D.C. coupled to the clock input 16 by resistor 42, one emitter is D.C. coupled by conductor 44 to the true output Q, and another emitter is D.C. coupled by conductor 46 to a D.C. set terminal $DC_S$. The other two emitters of transistor $Q_{10}$ form the $K_1$ and $K_2$ logic inputs to the flip-flop.

Transistor 50 is connected in parallel with transistor $Q_1$ and the base of the transistor is connected by resistors 52 and 54 to the positive voltage supply terminal 12. The junction between resistors 52 and 54 is connected to the D.C. set terminal $DC_S$. An A.C. set terminal $AC_S$ is A.C. coupled directly to the base of transistor 50 by a capacitor 56. A transistor 58 is connected in parallel with transistor $Q_2$ and the base of the transistor is also connected by resistors 60 and 62 to the positive voltage supply terminal 12. The D.C. reset terminal $DC_R$ is connected to the junction between resistors 60 and 62. An A.C. reset terminal $AC_R$ is A.C. coupled directly to the base of transistor 58 by a capacitor 64.

OPERATION

In order to understand the operation and advantages of the circuit 10, assume first that the circuit is in the logic "0" state. Transistors $Q_2$ and $Q_4$ will then be turned on, while transistors $Q_1$ and $Q_3$ will be turned off. As a result, the true output Q will be connected to ground by transistor $Q_4$ and the complement output $\overline{Q}$ will be connected to the positive terminal 12 by transistor $Q_2$. Base current to transistor $Q_2$ will be provided through resistor $R_2$ and transistor $Q_4$ to ground, and base current will be provided for transistor $Q_4$ through transistor $Q_2$ and resistor $R_4$. At the same time, the base of transistor $Q_1$ will be back biased through resistor $R_1$ and the base of transistor $Q_3$ will be back biased through resistor $R_3$. Thus, the binary will remain in this state until triggered as will presently be described.

The clock input 16 will normally be at a relatively high voltage level, usually the same voltage as terminal 12. In this condition, the collector, base and emitter of transistor $Q_5$ will each be at approximately the same voltage as terminal 12, the collector because it is connected to the terminal through resistor $R_5$ and transistor $Q_2$ which is on, and the base because it is connected through transistor $Q_7$ which is on because its base is connected through resistor 20 and transistor $Q_2$ to terminal 12. Assuming that inputs $J_1$ and $J_2$ are at a logic "1" state so that the capacitor $C_5$ will not be discharged through transistor $Q_9$, and that the D.C. reset terminals $DC_R$ and $DC_S$ are at the same potential as the positive voltage supply terminal 12, then capacitor $C_5$ will be charged positively with respect to the ground terminal 14. On the other hand, capacitor $C_6$ cannot be charged because one of the emitters of transistor $Q_{10}$ is connected to ground through conductor 44 and transistor $Q_4$ which is on. Also, transistor $Q_8$ will be turned off by reason of the fact that its base is also connected to ground through resistor 34. Then when a negative going clock pulse is applied to clock input 16, i.e., when terminal 16 goes to ground potential, the potential of the emitter of transistor $Q_5$ will be lowered and the positive charge on capacitor $C_5$ will forward bias the base-emitter junction and rapidly drive transistor $Q_5$ on. This places trigger point $T_1$ near ground potential and the negative transition is coupled to the base of transistor $Q_1$ by capacitor $C_1$. Base current then flows through transistor $Q_1$, capacitor $C_1$ and transistor $Q_5$, turning transistor $Q_1$ on. The collector of transistor $Q_1$ rises to the supply voltage at terminal 12 and a regenerative pulse is coupled through capacitor $C_3$ and resistor $R_3$ to the base of transistor $Q_3$, thereby turning on transistor $Q_3$, and a regenerative pulse is also coupled through resistors $R_2$ and $R_6$ and capacitor $C_2$ to the base of transistor $Q_2$, thereby turning transistor $Q_2$ off. As the complement output $\overline{Q}$ goes to ground potential, a regenerative pulse is coupled through resistors $R_1$ and $R_5$ and capacitor $C_1$ tending to further turn transistor $Q_1$ on and is coupled through resistor $R_4$ and capacitor $C_4$ to the base of transistor $Q_4$, turning transistor $Q_4$ off. The regeneration cycle is then complete and the circuit is again in a stable state with the true output Q at a logic "1" level, i.e., the voltage of supply terminal 12, and the complement output is at logic "0" level, i.e., essentially ground potential.

During the time that the clock terminal 16 is at ground potential, both logic transistor $Q_9$ and logic transistor $Q_{10}$ are turned on because an emitter of each is connected to ground potential through resistors 28 and 42, thus turning both transistor $Q_5$ and transistor $Q_6$ off after a negative pulse is applied to the appropriate trigger point $T_1$ or $T_2$. The resistors 28 and 42 provide a delay so that the appropriate transistor $Q_5$ or $Q_6$ may be first momentarily turned on by the discharge of the respective capacitor $C_5$ or $C_6$. This delay is chosen so that substantially all of the charge on the capacitors will be used to drive the base of the respective transistor $Q_5$ or $Q_6$. Thus, the size of the capacitors $C_5$ and $C_6$ and the value of resistors 28 and 42 determines the duration of the trigger pulses.

When the clock input 16 again goes positive, a positive going pulse is coupled through resistor 28 and capacitor 26 to the base of transistor $Q_7$ which turns transistor $Q_7$ on. This would rapidly recharge capacitor $C_5$, except that the recharging is disabled because the emitter of transistor $Q_9$ that is connected to the complement output $\overline{Q}$ is now at ground and transistor $Q_9$ is therefore turned on. The positive going pulse is also coupled through resistor 42 and capacitor 40 to the base of transistor $Q_8$ so that capacitor $C_6$ will be quickly charged through transistor $Q_8$ unless charging is inhibited by the conduction of logic transistor $Q_{10}$. The bistable is then immediately ready to start another cycle. Even if transistor $Q_{10}$ is initially conductive, if inputs $K_1$ and $K_2$ go to a logic "1" level prior to the next clock pulse, capacitor $C_6$ can be charged because the base of transistor $Q_8$ is connected to the true output Q, which is at a logic "1" level, and therefore transistor $Q_8$ is on.

Assuming that the inputs $K_1$ and $K_2$ are at a logic "1" level prior to the next clock pulse, then transistor $Q_{10}$ would be turned off because all emitters would be at a logic "1" level and capacitor $C_6$ would be charged essentially to the voltage of terminal 12. However, since the complement output $\overline{Q}$ is now at a logic "0" level, one of the emitters of transistor $Q_9$ is at a ground potential so that transistor $Q_9$ prevents the charging of capacitor $C_5$. Also, the base of transistor $Q_7$ is at ground so that it is turned off. Then during the next negative transition of the clock pulse, current discharged by capacitor $C_6$ will turn transistor $Q_6$ on and a negative pulse will be coupled through capacitor $C_2$ to the base of transistor $Q_2$, causing the binary to complement back to the logic "0" state by a regenerative process complementary to that heretofore described. The positive going portion of the clock pulse will again tend to turn transistors $Q_7$ and $Q_8$ on so as to recharge the appropriate capacitor $C_5$ or $C_6$ so that the cycle can be repeated.

Thus, it will be noted that if any one emitter of logic transistor $Q_{10}$ is at a logic "0" level, then transistor $Q_{10}$ will be conductive so that capacitor $C_6$ cannot be charged. This trigger point $T_2$ is disabled because transistor $Q_6$ cannot be turned on and the binary cannot be complemented from the logic "0" state to the logic "1" state. If any one of the emitters of logic transistor $Q_9$ is at a logic "0" level, then transistor $Q_9$ will be conductive and capacitor $C_5$ cannot be charged. As a result, trigger point $T_2$ is disabled and the binary cannot be complemented from the logic "1" state to the logic "0" state.

The operation of the logic gate formed by transistor $Q_{10}$ is illustrated by the truth table of FIGURE 2. The collector of transistor $Q_{10}$ is considered as the output of the gate and the inputs $K_1$ and $K_2$ are as labeled. When the output of the gate is a logic "1," then the capacitor $C_6$ can be charged, provided the binary is in a logic "1" state. FIGURE 3 is a similar truth table for transistor $Q_9$. FIGURE 4 is a truth table illustrating the operation of the binary circuit 10 when only one J input and one K input are used. Thus, if the J and K inputs are at the logic levels indicated in column $t_n$ prior to a clock pulse, the true output Q will be in the state represented in column $t_{n+1}$ after the clock pulse. FIGURE 5 is a truth table illustrating the operation of the circuit 10 when the four inputs $J_1$, $J_2$, $K_1$ and $K_2$ are used. Again the column $t_n$ represents the state of the inputs prior to a clock pulse, and column $t_{n+1}$ represents the state of the true output Q after the clock pulse.

The binary 10 may be set to the logic "1" state by both a D.C. logic level and by an A.C. pulse through inputs $DC_S$ and $AC_S$, and may be reset to a logic "0" state by either a D.C. logic level or an A.C. pulse through inputs $DC_R$ and $AC_R$. As mentioned, terminal $DC_S$ and $DC_R$ is customarily at a logic "1" level corresponding to the voltage of terminal 12. By changing input $DC_S$ to ground potential, transistor 50 may be turned on, thus causing the regeneration cycle heretofore described to switch transistors $Q_1$ and $Q_3$ on, and transistors $Q_2$ and $Q_4$ off. At the same time, transistor $Q_{10}$ is turned on during the period that the $DC_S$ is at ground potential to insure that capacitor $C_6$ is not charged during the reset period, thereby disabling trigger node $T_2$ and eliminating the possibility that transistor $Q_1$ might be turned on by a clock pulse occurring during the reset period. The binary may also be set to the logic "1" state by a negative pulse coupled through capacitor 56 to turn transistor 50 on. Similarly, the binary may be reset to the logic "0" state either by making the reset terminal $DC_R$ go to a logic "0," which also turns logic transistor $Q_9$ on and disables trigger node $T_1$, or by coupling a negative pulse through capacitor 64 to the base of transistor 58.

It will be noted that the binary circuit 10 has two separate trigger nodes $T_1$ and $T_2$ which are individually controlled by separate logic gate means. This not only permits the binary circuit to be operated as a J–K flip-flop, but also allows very rapid recovery of the trigger nodes independently of the regenerative process used to switch the state of the binary. The negative going portion of the clock pulse is used to turn transistors $Q_5$ and $Q_6$ on and trigger the regenerative process, while the positive going portion of the clock pulse is used to initiate recharging of the trigger capacitors $C_5$ and $C_6$. Charging of capacitors $C_5$ and $C_6$ is very rapid because of the current gain of the emitter-follower transistors $Q_7$ and $Q_8$. The time required for charging capacitor $C_6$, for example, is determined by the RC time constant of resistor 42, capacitor 40, and that value of capacitor $C_6$ referred to the base of transistor $Q_8$ as a result of the current gain of transistor $Q_8$. Since resistor 34 interconnects the true output Q and the base of gating transistor $Q_{10}$ and resistor 20 interconnects the complement output $\overline{Q}$ and the base of gating transistor $Q_9$, the transistors $Q_9$ and $Q_{10}$ are turned on only when gating is required. This results in a lower average power dissipation. Transistors $Q_7$ and $Q_8$ in conjunction with the capacitors 26 and 40 provide a means of rapid gate recovery, drawing only transient current and allowing resistors 20 and 34 to be relatively large to decrease average power dissipation. Connecting an emitter of gating transistor $Q_9$ to the complement output $\overline{Q}$ and an emitter of gating transistor $Q_{10}$ to the true output Q provides a very rapid and positive control of the self-gating or steering function. Also, by connecting an emitter of the gating transistor $Q_9$ to the D.C. reset terminal $DC_R$ and an emitter of transistor $Q_{10}$ to the D.C. set terminal $DC_S$, the D.C. set and reset pulses automatically inhibit the clock input without an additional transistor.

The circuit 10 has been fabricated as an all diffused integrated circuit. When operated using a supply voltage of 2.7 volts at terminal 12, the standby power required is typically 270 microwatts. The power required at 50 kHz. is typically 300 microwatts. Fan-out is five, and fan-in is less than two unit loads. The operating frequency ranges from 700 kHz. to 1 megacycle. The rise time at the output is typically 70–100 nanoseconds, and the fall time is typically 20–50 nanoseconds. The voltage required for trigger purposes is dependent upon the clock duty cycle $T_f$ and is typically 0.85 at $T_f$=20 nanoseconds, 0.90 at $T_f$=50 nanoseconds, and 1.25 at $T_f$=200 nanoseconds. The pulse period required to accomplish a D.C. set or reset is typically from 100 to 500 nanoseconds, and the pulse for achieving an A.C. set or reset is typically 50 to 200 nanoseconds.

Although a preferred embodiment of the invention has been described in detail, it is to be understood that various changes, substitutions and alterations can be made therein without departing from the spirit and scope of the invention as defined by the appended claims.

What is claimed is:

1. In a binary circuit having true and complement outputs and first and second trigger nodes for switching the binary circuit to the logic "1" state and to the logic "0" state, respectively, the combination of:

first and second trigger transistors the collectors of which are connected to the first and second trigger nodes, respectively, and the emitters of which are common with a clock input to the binary circuit, first and second trigger capacitors connected to the bases of the first and second trigger transistors, respectively, such that when the potential of the clock input is lowered the capacitors will discharge and provide base current to the respective trigger transistors and turn the respective trigger transistors on, first and second charging transistors connected in emitter-follower configuration for charging the respective first and second trigger capacitors, and first and second logic input means connected to the first and second trigger capacitors, respectively, for selectively, in response to input logic levels, discharging the respective capacitors to thereby disable the respective trigger transistors.

2. The combination defined in claim 1 wherein the base of each of the first and second charging transistors is A.C. coupled through a delay resistor to the clock input terminal whereby the trailing transistion of the clock pulse will turn the charging transistors on to recharge the respective trigger capacitors.

3. The combination defined in claim 1 wherein the bases of the first and second charging transistors are connected by separate resistances to the complement and true outputs, respectively, whereby the respective charging transistors will be turned off when the respective outputs are at logic "0" level.

4. The combination defined in claim 1 wherein the first and second logic input means are comprised of first and second multiple emitter transistors the collectors of which are connected to the first and second trigger capacitors, respectively, and the emitters of which form the logic input.

5. The combination defined in claim 4 wherein the bases of the first and second multiple emitter transistors are connected to the complement and true outputs, respectively, such that the transistor will be turned off when no logic function is required due to the state of the binary circuit.

6. The combination defined in claim 2 wherein the first and second logic input means each comprises a multiple emitter transistor the collector of which is connected to the respective trigger capacitor and the emitters of which form the logic inputs, and the bases of the input transistors are common with the bases of the respective first and second charging transistors.

7. The combination defined in claim 6 further characterized by first and second circuit means connecting the bases of the first and second charging transistors, respectively, to the complement and true outputs, respectively, whereby the respective transistors will be turned off when no logic function is required due to the state of the binary circuit.

8. The combination defined in claim 4 wherein an emitter of each multiple emitter transistor is connected to the clock input terminal through a resistor whereby the respective multiple emitter transistors will be turned on after the initial clock transistion to turn the respective trigger transistor off.

9. The combination defined in claim 4 wherein an emitter of the first multiple emitter transistor is connected to the complement output and an emitter of the second multiple emitter transistor is connected to the true output whereby the binary circuit will be operated as a J-K flip-flop.

10. The combination defined in claim 1 wherein the collectors of the first and second trigger transistors are connected through resistors to the complement and true outputs, respectively, whereby the outputs will provide the collector supply voltage for the respective trigger transistors and one of the trigger transistors will be disabled when the respective output is at logic "0" level.

11. In a binary circuit, the combination of:

first and fourth complementary output transistors the collectors of which are common and form the true output of the binary circuit, second and third complementary output transistors the collectors of which are common and form the complement output of the binary circuit, first circuit means interconnecting the emitters of the first and second output transistors and a logic "1" level voltage supply terminal, second circuit means interconnecting the emitters of the third and fourth output transistors and a logic "0" voltage supply terminal, third circuit means coupling the base of the first output transistor to the complement output, fourth circuit means coupling the base of the second output transistor to the true output, fifth circuit means coupling the base of the third output transistor to the complement output, sixth circuit means coupling the base of the fourth output transistor to the true output, first and second trigger nodes A.C. coupled to the bases of the first and second output transistors, respectively, first and second trigger transistors the collectors of which are connected to the first and second trigger nodes, respectively, and to the complement and true outputs, respectively, by separate resistances, seventh circuit means interconnecting the emitters of the trigger transistors and a clock input terminal, first and second trigger capacitors connected between the bases of the first and second trigger transistors and a logic "0" level voltage supply terminal, first and second charging transistors connected to charge the first and second trigger capacitors, respectively, the emitters of each charging transistor being connected to the respective capacitor and the collector being connected to a supply voltage terminal, eighth circuit means including a delay resistance A.C. coupling the base of the first charging transistor to the clock input terminal, ninth circuit means including a delay resistance A.C. coupling the base of the second charging transistor to the clock input terminal, and first and second multiple emitter logic input transistors the collectors of which are connected to the base of the first and second trigger transistors, respectively, and the emitters of which form logic inputs, and the bases of which are connected through a resistance to a reference supply voltage.

12. The combination defined in claim 11 wherein the bases of the first and second logic input transistors are common with the bases of the first and second charging transistors respectively.

13. The combination defined in claim 11 wherein an emitter of each logic input transistor is connected to the clock input by a resistor.

14. The combination defined in claim 11 wherein an emitter of the first logic input transistor is connected to the complement output and an emitter of the second logic input transistor is connected to the true output whereby the binary will operate as a J-K flip-flop.

References Cited

NEREM Record, "High Level Transistor Transistor Logic Flip-Flops," R. Van Ligten et al., Nov. 4, 1965, pp. 176 and 177.

ARTHUR GAUSS, Primary Examiner

B. P. DAVIS, Assistant Examiner

U.S. Cl. X.R.

307—213, 291, 299, 303